United States Patent
Horvath et al.

(10) Patent No.: US 6,761,192 B2
(45) Date of Patent: Jul. 13, 2004

(54) ASSEMBLY FOR AUTOMATIC VEHICLE FUELING

(75) Inventors: Ronald F. Horvath, Sturtevant, WI (US); Kenneth J. Dragotta, Milwaukee, WI (US); Frank M. Bilicki, New Berlin, WI (US)

(73) Assignee: Swiftflo, LLC, Milwaukee, WI (US)

( * ) Notice: Subject to any disclaimer, the term of this patent is extended or adjusted under 35 U.S.C. 154(b) by 0 days.

(21) Appl. No.: 10/246,863

(22) Filed: Sep. 19, 2002

(65) Prior Publication Data

US 2004/0055664 A1 Mar. 25, 2004

(51) Int. Cl.⁷ ................................................ B65B 1/04
(52) U.S. Cl. ........................... 141/98; 141/94; 220/86.2
(58) Field of Search ............................. 141/98, 67, 94, 141/231, 232, 284, 351–355, 360–362, 383, 386; 220/86.2

(56) References Cited

U.S. PATENT DOCUMENTS

| | | | |
|---|---|---|---|
| 3,502,117 A | * | 3/1970 | Nebelsiek et al. ............. 141/7 |
| 4,312,373 A | | 1/1982 | Tilling et al. |
| 4,681,144 A | | 7/1987 | Horvath et al. |
| 4,712,709 A | | 12/1987 | Horvath et al. |
| 4,794,960 A | | 1/1989 | Hawley et al. |
| 4,881,591 A | | 11/1989 | Hollerback |
| 5,255,721 A | | 10/1993 | Brand |
| 5,383,500 A | | 1/1995 | Dwars et al. |
| 5,638,875 A | | 6/1997 | Corfitsen |
| 5,758,701 A | | 6/1998 | Corfitsen |
| 6,202,008 B1 | | 3/2001 | Beckert et al. |
| 6,338,008 B1 | | 1/2002 | Kohut et al. |
| 6,343,241 B1 | | 1/2002 | Kohut et al. |
| 6,354,343 B1 | | 3/2002 | Strnad et al. |
| 6,367,516 B1 | | 4/2002 | Christman et al. |
| RE37,776 E | * | 7/2002 | Foltz .......................... 220/86.2 |
| 6,418,985 B2 | | 7/2002 | Aguilar |

* cited by examiner

Primary Examiner—Steven O. Douglas
(74) Attorney, Agent, or Firm—Jansson, Shupe & Munger, Ltd

(57) ABSTRACT

A fuel tank inlet assembly for receiving fuel during automatic vehicle fueling and a pump assembly for delivering fuel during automatic vehicle fueling and the combination thereof. The fuel tank inlet assembly includes a fuel conduit with a fuel exit for operative connection with a fuel tank and the pump assembly includes a fuel nozzle for operative connection with the inlet assembly. One preferred embodiment of the invention includes a positioning system which utilizes inductive triangulation to connect the pump assembly to the inlet assembly.

43 Claims, 9 Drawing Sheets

ASSEMBLY FOR AUTOMATIC VEHICLE FUELING

FIELD OF THE INVENTION

This invention relates to an apparatus for transferring a liquid from fuel storage to a vehicle fuel tank and, more particularly, to automatic fueling of vehicles at retail fueling stations.

BACKGROUND OF THE INVENTION

Retail selling of gasoline and other vehicle fuels is a major industry throughout the world. By one recent estimate, there are on the order of 200,000 retail fuel service stations in the United States alone.

Such stations are referred to as either "full service" stations or "self service" stations, depending on whether a station employee or the customer himself is responsible for manipulating the pump, fuel hose, and valve structure into position for fueling the vehicle. In either case, however, substantial human activity is required by a person outside the vehicle to accomplish the fueling of the vehicle fuel tank.

In view of the extremely high volume of retail fuel sales, the high costs of providing full service, and the inconvenience for a customer of all the manipulative steps necessary for vehicle fueling, a need exists for improved fueling station methods and apparatus. In particular, a need exists for practical automatic fueling apparatus and methods.

A number of attempts have been made in the prior art to improve retail fueling procedures. Some examples include the disclosures of the following U.S. Pat. Nos.:

U.S. Pat. No. 3,095,020 (Darwin)
U.S. Pat. No. 3,364,940 (Ginsburgh et al.)
U.S. Pat. No. 3,410,320 (Ginsburgh et al.)
U.S. Pat. No. 3,502,117 (Nebelsiek et al.)
U.S. Pat. No. 3,527,268 (Ginsburgh)
U.S. Pat. No. 3,530,906 (Ginsburgh et al.)
U.S. Pat. No. 3,536,109 (Ginsburgh et al.)
U.S. Pat. No. 3,642,036 (Ginsburgh et al.)
U.S. Pat. No. 4,681,144 (Horvath et al.)
U.S. Pat. No. 4,712,709 (Horvath et al.)
U.S. Pat. No. 4,881,581 (Hollerback)

These patents describe various methods and types of apparatus for facilitating fueling and for automatic fueling using overhead, on-ground or below-ground equipment. However, the automatic fueling systems and methods disclosed in the prior art have substantial inherent practical problems.

A need has existed for an improved practical approach to automatic engagement of a filling nozzle with fuel tank intake devices on vehicles. In particular, there is a need for an improved fuel-intake device which can mounted lateral to the tank and can readily be engaged automatically by a fuel nozzle for filling the tank through the a fuel conduit connected to the tank.

In addition, there is a need for automatic fueling assemblies which do not require costly retrofitting of vehicle fuel tanks. Furthermore, there is a need for automatic fueling assemblies which provide for connection of the pump to the vehicle using advanced positioning systems which do not require powered devices on the vehicle.

OBJECTS OF THE INVENTION

It is an object of this invention, in the field of automatic vehicle fueling, to provide an improved fueling assembly for fueling conventional vehicle tanks without requiring costly retrofitting of the tanks.

Another object of the invention is to provide a vehicle fuel tank inlet assembly which utilizes the existing fuel port on a vehicle's fuel tank and avoids the need for drilling or replacement of fuel tanks.

Another object of the invention is to provide a vehicle fuel tank inlet assembly which prevent fuel leaks from the fuel tank.

Another object of this invention is to provide a fueling assembly for fueling vehicle tanks which utilizes an advanced positioning system to locate the vehicle fuel inlet and move the pump nozzle toward the inlet without need of a powered signal or response from the vehicle.

Another object is to provide a vehicle fuel tank inlet assembly which can be mounted to a vehicle at a position lateral to the fuel tank and is connected to the fuel tank using a flexible conduit, such that impacts to the inlet assembly are not transferred to the tank.

Still another object of the invention is to provide a pump assembly for automatic vehicle fueling which includes a positioned system using inductive triangulation to locate the fuel inlet.

Yet another object of the invention is to provide a fueling assembly for automatic fueling which provides for easy installation and uses less space in the vehicle.

These and other objects of the invention will be apparent from the following descriptions and from the drawings.

SUMMARY OF THE INVENTION

This invention is an improved automatic vehicle fueling assembly for use with a vehicle fuel tank and fuel line. The invention represents a significant advance over the state of the art by providing novel elements, including a fuel tank inlet assembly and a pump assembly for delivering fuel to a fuel tank.

Before operation of the automatic vehicle fueling assembly, a vehicle must be driven into position over the pump assembly. While such vehicle positioning is occurring, the pump assembly is positioned below the surface of the ground and is covered by a door or doors, preferably a pair of sliding doors which are generally flush with the ground. The doors are subsequently opened to expose the pump assembly. Lines or other guidance means on or beside the path of the vehicle enable the driver to move the vehicle into an approximate position at which the pump assembly can extend into contact with the fuel tank inlet assembly as described below.

The automatic vehicle fueling assembly includes a fuel tank inlet assembly having a fuel conduit with a fuel entrance and exit for operative connection with a fuel tank and a pump assembly with a fuel nozzle defining a passageway for fuel and providing for operative connection to the fuel entrance. The fuel conduit preferably includes a flexible fuel hose having a first end for operative connection to the fuel nozzle during fueling and a second end operatively connected to the fuel tank.

A certain preferred fuel tank inlet assembly includes a fitting with at least a first, second and third opening. The first opening is provided for operative connection to the fuel nozzle during fueling, the second opening is provided for operative connection to the fuel line, and the third opening is provided for operative connection to the fuel tank. In a most preferred embodiment, the fitting is a "Y"-shaped fitting, though it could also be a "T"-shaped fitting or of any other shape. The inlet assembly also preferably includes a first valve for controlling fuel flow through the first opening and a second valve for controlling fuel flow through the second opening. The first and second valves are preferably spring loaded and allow unidirectional fuel flow toward the tank and prevent fuel from "back flowing" from the tank to either the fuel exit or the manual fueling position.

In a certain preferred embodiment the fuel tank inlet assembly further includes a fuel inlet adapter connected with respect to the first end of the fuel hose. The fuel inlet adapter is preferably mounted to the vehicle (preferably to the underside of the trunk) and has an inlet cavity for receiving the fuel nozzle. In a most preferred embodiment, flexible sealing doors extend into the inlet cavity to provide sealing between the nozzle and inlet adapter and a slide cover covers the inlet cavity and prevents debris from entering the cavity. The slide cover is preferably formed so as to open upon contact with the fuel nozzle.

The preferred pump assembly includes a frame which supports the nozzle and is positioned underground, below the vehicle, before fueling and is upwardly moveable to provide operative connection between the nozzle and the fuel entrance. The preferred pump assembly also includes a nozzle sheath having a sheath cavity in which the nozzle is positioned before fueling, and a collar connected with respect to the nozzle sheath and formed for mating engagement with the fuel entrance. The preferred nozzle sheath is compressible such that when upward movement of the frame causes the collar to contact the fuel entrance, the sheath stops moving upward and the nozzle continues to move upward out of the sheath cavity and into the inlet cavity. The sheath may be comprised of a telescopic cylinder and/or may include compression springs at the connection points between the sheath and the collar and frame.

The frame is preferably connected with respect to at least one riser which powers upward and downward movement of the frame and to a lateral movement device which moves the frame so that the nozzle is substantially aligned with the fuel inlet adapter. In a most preferred embodiment, the frame is connected to the lateral movement device through the riser. The lateral movement device is preferably a slide plate positioned underground which provides for movement in the X and Y direction, i.e., perpendicular directions in the substantially horizontal plane.

The fueling assembly preferably further includes a positioning system for locating the fuel inlet adapter and controlling the lateral movement device so that the nozzle is substantially aligned with the fuel inlet adapter. The positioning system may be used with a conductive reference marker located at a known position from the fuel inlet adapter and preferably includes at least three sense inductors located at known positions with respect to the pump assembly, and a controller for moving the lateral movement device so that the nozzle is substantially aligned with the fuel inlet adapter. The variation in distance between the reference marker and the sense inductors preferably causes inductance variation in each sense inductor which the controller uses to calculate the position of the fuel inlet adapter relative to the nozzle. In a certain most preferred embodiment, the controller can continue to calculate the position of the fuel inlet adapter relative to the nozzle as the nozzle is moved upwardly or downwardly (in the Z direction) and laterally (in the X and Y directions).

In an alternate description of the pump assembly, the frame supporting the fuel nozzle is positioned below the vehicle before fueling and is upwardly moveable to provide operative connection between the nozzle and the fuel entrance. Such a fueling assembly preferably includes a nozzle sheath having a sheath cavity in which the nozzle is positioned before fueling, and a collar connected with respect to the nozzle sheath and formed for mating engagement with the fuel inlet adapter. As above, the nozzle sheath is compressible such that when upward movement of the frame causes the collar to contact the fuel inlet adapter, the sheath stops moving upward and the nozzle continues to move upward out of the sheath cavity and into the inlet cavity to provide operative connection with the fuel hose.

The pump assembly preferably further includes a pan for preventing fuel spills which extends outwardly from the nozzle sheath and has a drain opening, a flexible drain hose connected with respect to the drain opening which extends to a container to collect spilled fuel and debris, and a shroud for preventing fuel spills which is connected with respect to the pan and has a shroud recess in which the collar is positioned. The preferred pump assembly also includes a fuel pipe which is operatively connected to the nozzle to provide the nozzle with fuel. It is preferred that a vacuum blower be operatively attached to the fuel pipe to enable removal of fuel vapor from the fuel tank during fueling.

In another description of the invention, the vehicle fuel tank inlet assembly is for use with a fuel tank having a fuel line leading to a fueling position which allows manual fueling. The inlet assembly delivers fuel to the fuel tank during automatic fueling and comprises a flexible fuel conduit with a fuel entrance and a fuel exit for operative connection with the fuel tank, a first unidirectional valve positioned between the fuel tank and the fuel entrance to prevent fuel from moving toward the fuel entrance, a second unidirectional valve positioned between the fuel tank and the fueling position to prevent fuel from moving toward the fueling position, and a fuel inlet adapter with an inlet cavity for receiving a fuel nozzle during automatic fueling connected with respect to the fuel entrance and mounted to the vehicle. The first and second unidirectional valves are preferably spring loaded.

The inlet assembly preferably includes flexible sealing doors which extend into the inlet cavity and provide for sealing between the adapter and the nozzle during fueling. The adapter may also include a slide cover for preventing debris from entering the cavity and which opens upon contact with the fuel nozzle.

The fuel inlet adapter is also preferably mounted at a position lateral to the tank, i.e., not directly below or above the tank. The conduit preferably travels laterally from the inlet adapter to the tank.

The inlet assembly preferably includes a conductive reference marker at a known location relative to the adapter which enables a positioning system to calculate the position of the fuel inlet adapter. Such a conductive reference marker preferably allows use of triangulation by sense inductors to calculate the adapter position and does not require a separate power source such as a battery.

In another description of the invention, the fuel pump assembly is provided for automatic fueling of a fuel tank in a vehicle which has a conductive reference marker located at a known position relative to the fuel tank. The pump assembly preferably includes a fuel nozzle defining a passageway for fuel for operative connection with the fuel tank and a positioning system for moving the fuel nozzle into operative connection with the fuel tank during automatic fueling. The positioning system includes a lateral movement device operatively supporting the nozzle, at least three sense inductors for locating the conductive reference marker which are located at known positions relative to the nozzle and which experience inductance variation when the distance between the marker and the respective sense inductor changes, and a controller for moving the lateral movement device in response to inductance variation so that the nozzle is substantially aligned for operative connection to the fuel tank.

The controller preferably uses the inductance variation to calculate the position of the fuel tank and can calculate the position of the fuel tank relative to the nozzle as the nozzle is moved upwardly and laterally. The preferred lateral movement device comprises slide plates which can be moved in a first direction and in a second direction substantially perpendicular to the first direction, i.e., in the X and Y directions.

The pump assembly preferably further comprises a frame which supports the fuel nozzle, is positioned below the vehicle before fueling and is upwardly moveable to provide operative connection between the nozzle and the fuel tank. The frame is preferably connected with respect to at least one riser which powers upward and downward movement of the frame. The frame is also preferably connected with respect to the lateral movement device which moves the frame in the X and Y directions so that the nozzle is substantially aligned with the fuel tank.

During operation of the invention, when a vehicle is driven into approximate position above the pump assembly, the positioning system begins use of the sense inductors to locate the reference marker. Immediately, the riser and lateral movement device move the nozzle toward the inlet adapter. As the nozzle moves toward the inlet adapter, the sense inductors continue to hone in on the adapter and the controller continues to calculate the position of the adapter and operate the riser and lateral movement device. Because the positioning system utilizes the inductance variations in the sense inductors to guide the pump assembly, the vehicle need not be equipped with any device requiring power to communicate the inlet adapter's position. Instead, the reference marker simply affects the inductance in the sense inductors.

In a certain preferred embodiment the fuel tank has a fuel entrance and further includes a nozzle sheath having a sheath cavity in which the nozzle is positioned before fueling, and a collar for mating engagement with the fuel entrance and which is connected with respect to the nozzle sheath. The preferred nozzle sheath is compressible such that when upward movement of the frame causes the collar to contact the fuel entrance, the sheath stops moving upward and the nozzle continues to move upward out of the sheath cavity.

In another preferred embodiment the pump assembly includes a pan for preventing fuel spills which extends outwardly from the nozzle sheath and has a drain opening, a flexible drain hose connected with respect to the drain opening and extending to a container, and a shroud for preventing fuel spills which is connected with respect to the pan and has a shroud recess in which the collar is positioned.

The preferred pump assembly further includes a fuel pipe which is operatively connected to the nozzle so that fuel passes from the fuel pipe through the nozzle. The preferred pump assembly may include a vacuum blower operatively attached to the fuel pipe for removing fuel vapor from the fuel tank during fueling.

BRIEF DESCRIPTION OF THE DRAWINGS

The drawings illustrate preferred embodiments which include the above-noted characteristics and features of the invention. The invention will be readily understood from the descriptions and drawings. In the drawings.

DETAILED DESCRIPTION OF PREFERRED EMBODIMENTS

Figure 1:
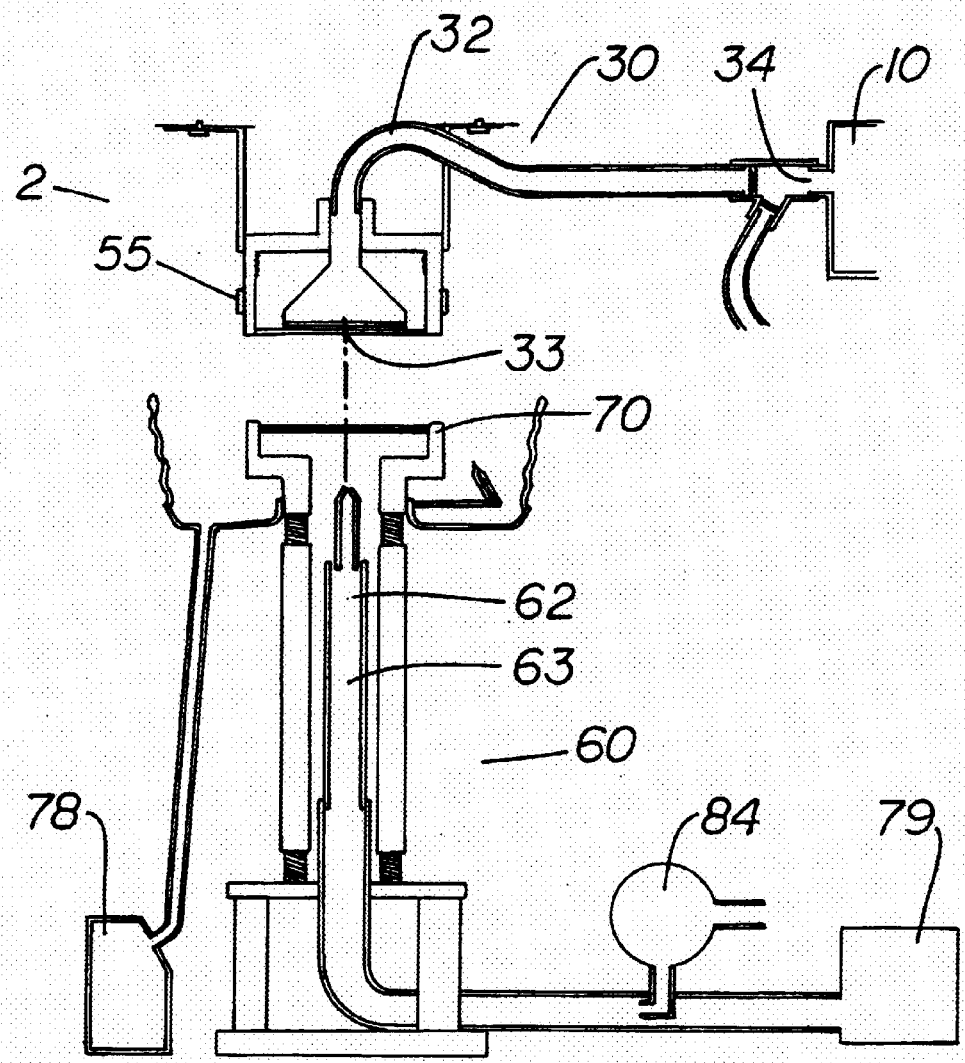
FIG. 1 is a cross sectional view (not to scale) of an automatic vehicle fueling assembly in accordance with this invention before fueling.
Figure 2:
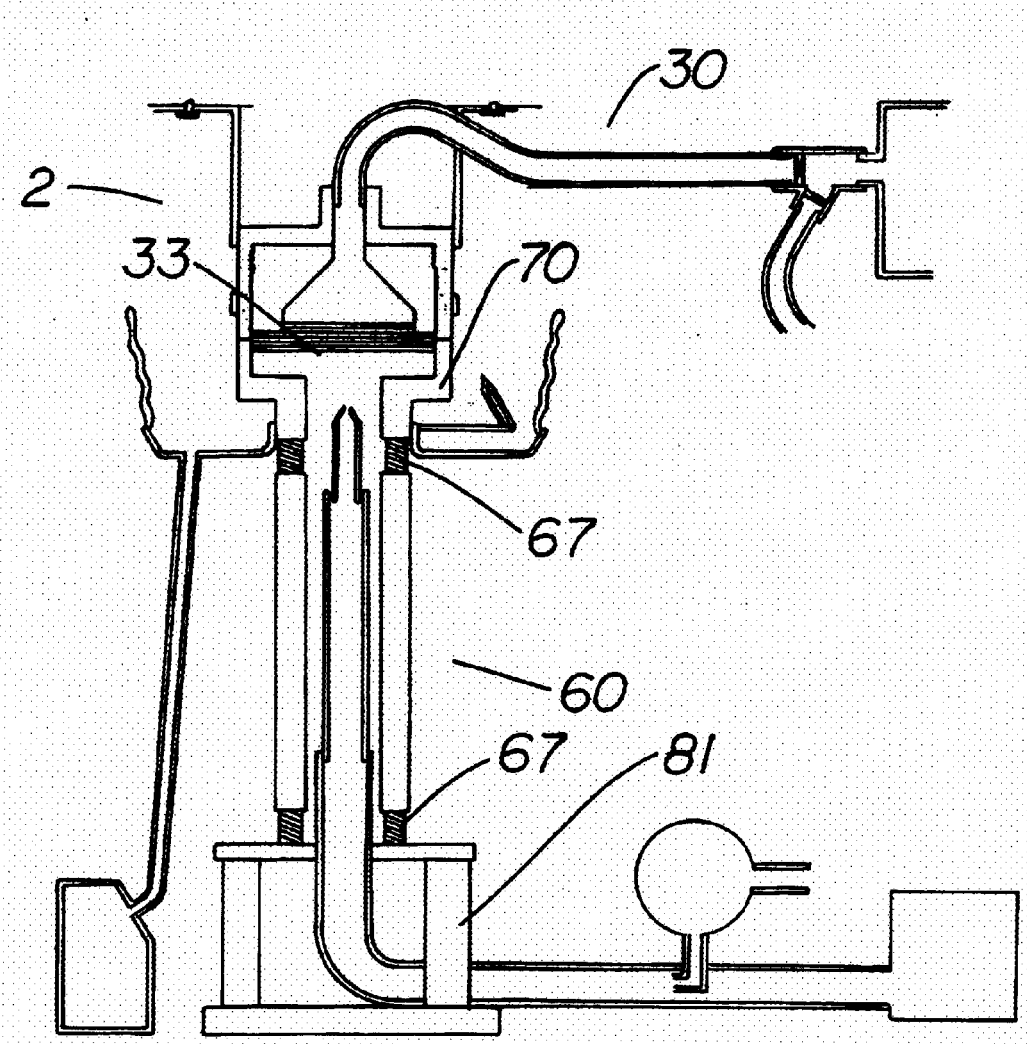
FIG. 2 is a cross sectional view (not to scale) of an automatic vehicle fueling assembly in accordance with this invention during the upward movement of the pump assembly, specifically when the collar contacts the fuel entrance.
Figure 3:
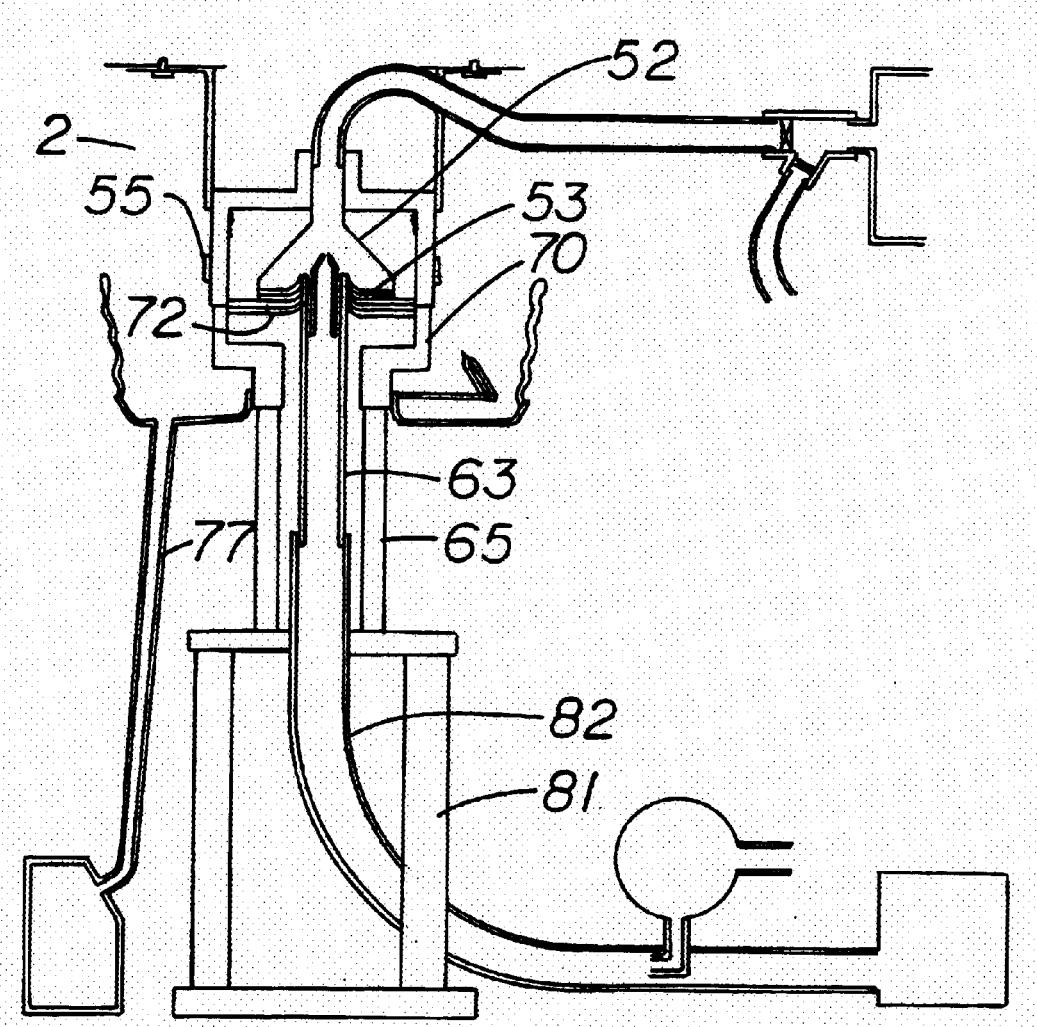
FIG. 3 is a cross sectional view (not to scale) of an automatic vehicle fueling assembly in accordance with this invention when the pump assembly and fuel tank inlet assembly are engaged for fueling.

FIGS. 1, 2 and 3 show the automatic vehicle fueling assembly 2 before fueling, during upward movement of the pump assembly 60 toward fuel tank inlet assembly 30 including engagement of the fuel entrance 33 by the collar 70, and during fueling, respectively.

Figure 4:
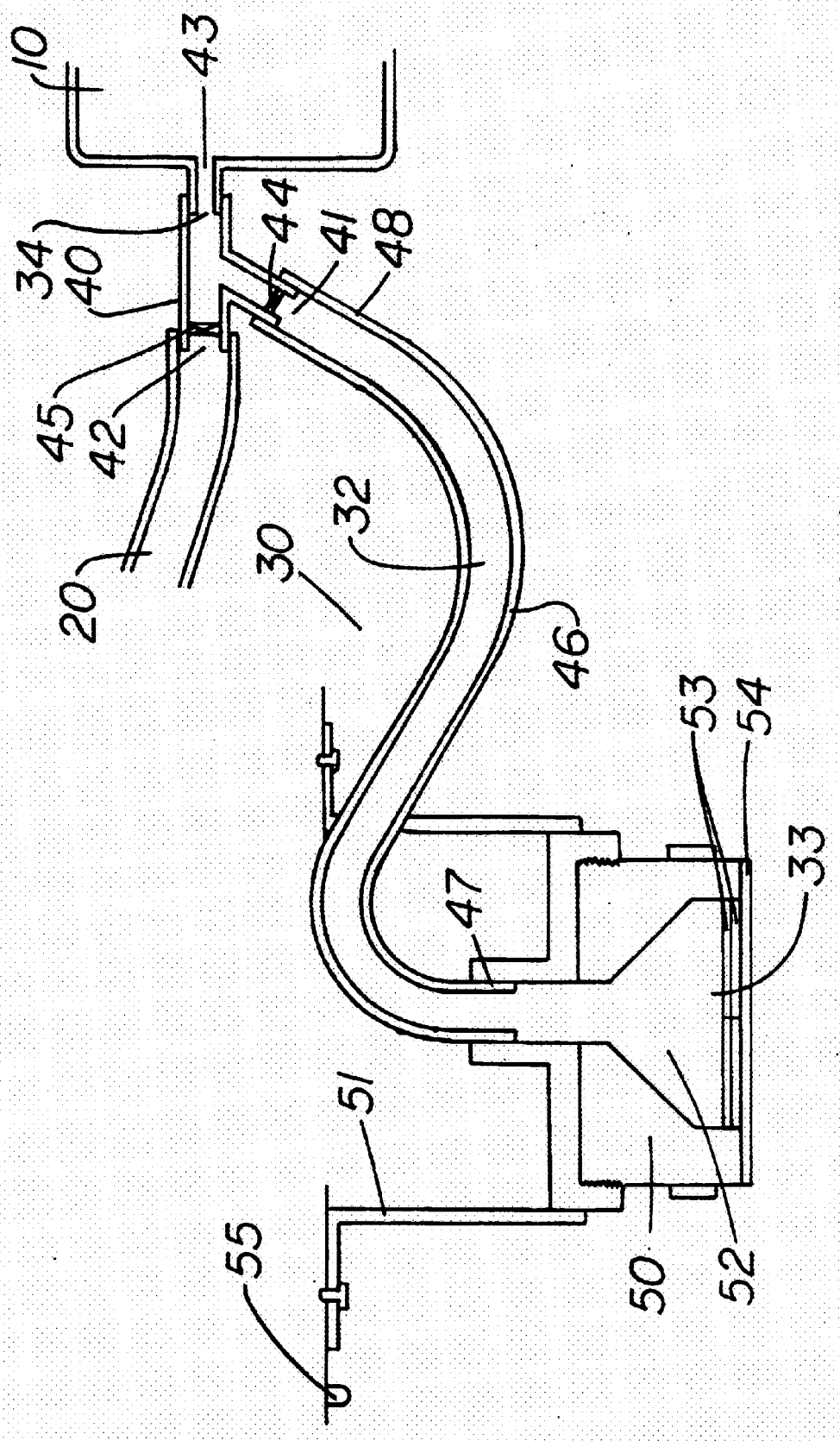
FIG. 4 is a larger cross sectional view (not to scale) of the fuel tank inlet assembly.

Fuel tank inlet assembly 30 is shown in greater detail in FIG. 4. Inlet assembly 30 provides for automatic fueling of a vehicle with a standard fuel tank 10 and standard fuel line 20 which leads to a position for manual fueling (typically on the side of a vehicle). Inlet assembly 30 includes fuel conduit 32 which has a fuel entrance 33 and fuel exit 34. Fuel exit 34 is operatively connected to fuel tank 10. Fuel conduit 32 is preferably comprised of a flexible fuel hose 46.

Flexible fuel hose 46 has a first end 47 and a second end 48. Second end 48 of fuel hose 46 is connected to first opening 41 of fitting 40. Second opening 42 of fitting 40 is connected to fuel line 20. Third opening 43 of fitting 40 is connected to fuel tank 10. Although fitting 40 is shown as having three openings 41,42,43, it is acknowledged that fitting 40 may include more than three openings if needed.

Valve 44 is positioned in fitting 40 to prevent fuel from traveling from fitting 40 toward first end 47 of hose 46. Valve 45 is positioned in fitting to prevent fuel from traveling from fitting 40 toward the position for manual fueling. Each of valves 44,45 is unidirectional, i.e., allowing fuel flow in only one direction, and is preferably spring loaded. Each of valves 44,45 allows vapor to escape from tank 10 as is necessary during fueling.

First end 47 of hose 46 is shown connected to fuel inlet adapter 50. Inlet adapter 50 defines inlet cavity 52 which received nozzle 62 during fueling. Inlet adapter 50 also includes sealing doors 53 which provide for sealing engagement between nozzle 62 and inlet adapter 50 during fueling.

Figure 8:
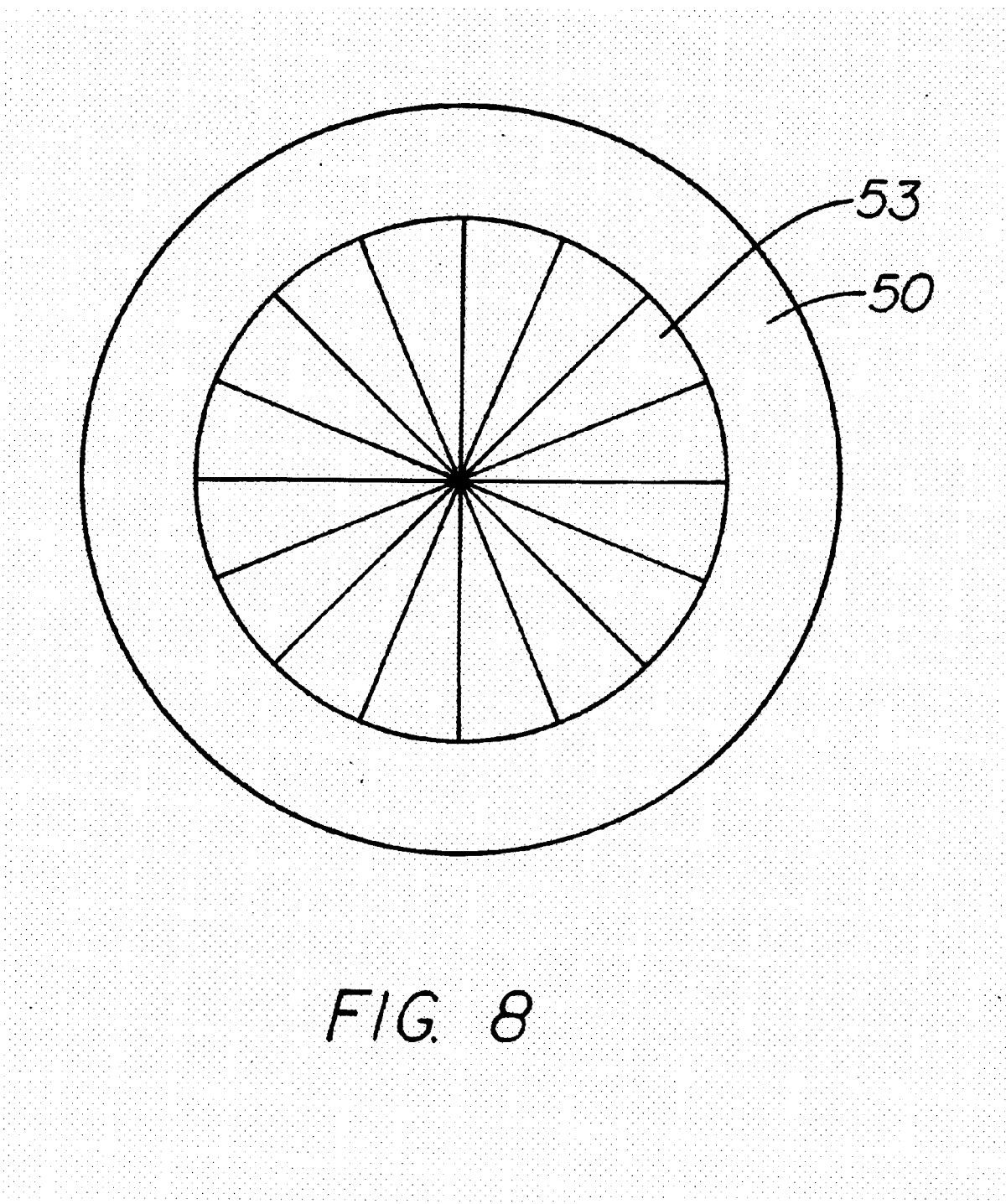
FIG. 8 is a plan view of the bottom side of the sealing doors on the fuel inlet adapter.

Sealing doors 53 are preferably rubber and are shown in more detail in FIG. 8. Inlet adapter 50 also includes slide cover 54 which covers inlet cavity 52. Slide cover 54 opens when contacted by nozzle 62 and is shown in greater detail in FIG. 9.

Inlet adapter 50 is mounted to the underside of the vehicle by vehicle mount 51. Also positioned on the underside of vehicle is conductive reference marker 55. Marker 55 is shown as an annular piece attached to adapter 50; however, marker 55 can be anywhere as long as marker 55 is placed at a known position relative to inlet adapter 50.

Figure 5:
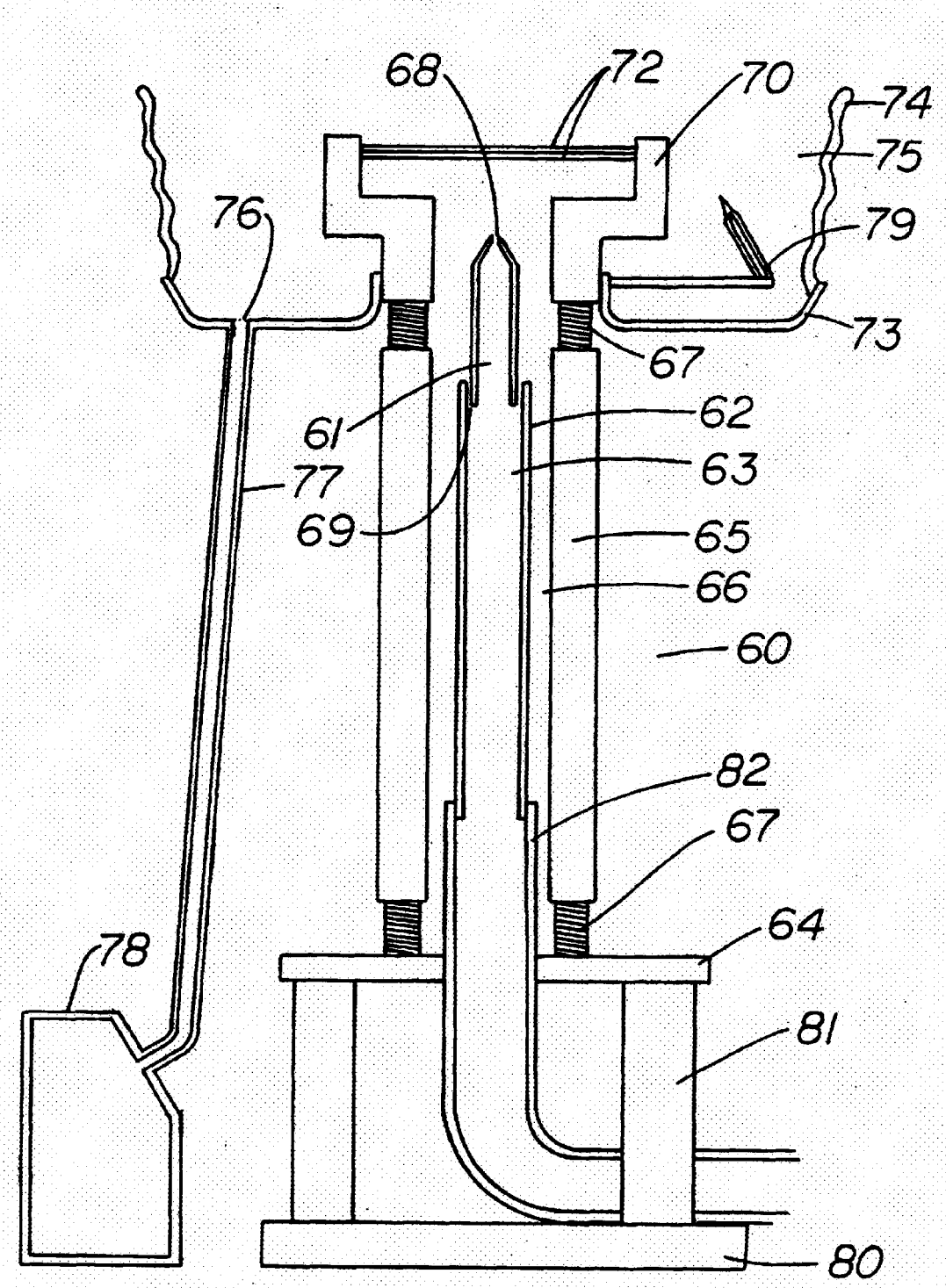
FIG. 5 is a larger cross sectional view (not to scale) of the pump assembly.

Pump assembly 60 is shown in greater detail in FIG. 5. Pump assembly 60 provides for delivery of fuel through nozzle 62 to inlet adapter 50. Nozzle 62 defines fuel passageway 63. Nozzle 62 is operatively connected to fuel pipe 82 so that fuel passes from fuel regulator 79 to inlet adapter 50. As is known in the art, fuel passes along the inner circumference of fuel pipe 82 and nozzle 62 while vapor moves in the opposite direction in the center of pipe 82 and nozzle 62. This can be seen at upper end 61 of nozzle 60 where vapor is able to pass through vapor hole 68, while liquid fuel is able to pass though fuel port 69. As shown in FIG. 1, vacuum blower 84 is connected to and removes vapor from fuel pipe 82.

Nozzle 62 is supported by frame 64. Frame 64 is connected to risers 81 which provide for upward and downward movement of frame 64 and, thus, nozzle 62. Risers 81 are connected to lateral movement device 80 which is preferably a slide plate or slide plates capable of movement in the X and Y directions. By controlling the movement of risers 81 and lateral movement device 80, nozzle 62 can be positioned for connection with fuel conduit 32.

Nozzle sheath 65 defines sheath cavity 66 in which nozzle 62 is located prior to fueling. Nozzle sheath 65 is preferably cylindrical, is connected to frame 64 and collar 70 and is compressible such that during upward movement by risers 81, upon contact by collar 70 with fuel entrance 32 or inlet adapter 50 the top end of sheath 65 reaches a fixed height while the bottom end of sheath 65 continues to move upward. Compression of sheath 65 is preferably provided by use of compression springs 67 which interconnect sheath 65 with frame 64 and collar 70. While the top end of sheath 65 remains at a fixed height, nozzle 62 continues to move upward, substantially out of sheath cavity 66 to connect with inlet adapter 50.

Spanning across sheath cavity 66 are seals 72 which prevent debris from entering cavity 66. Seals 72 are preferably rubber and are slotted to allow movement of nozzle 62 therethrough. Pan 73 extends outwardly from collar 70 and preferably terminates in a raised edge to catch splattered fuel, or water or ice from the underside of the vehicle. Pan 73 includes a drain opening 76 and flexible and extendable drain hose 77 is connected thereto and directs fluid into container 78 so that the ground is not contaminated. Extending upwardly from pan 73 is shroud 74 which acts to collect splashed fuel, water and ice. Shroud 74 defines shroud recess 75 in which collar 70 is positioned. Shroud 74 is preferably corrugated rubber which is flexible and can contact the underside of the vehicle without causing damage.

Collar 70 may also have a high pressure air valve 79 extending into shroud recess 75. Air valve 79 may be used to clean or knock debris from fuel entrance 33 or adapter inlet 50 before fueling so that such debris is not carried by the fuel to tank 10.

As stated above, FIGS. 1, 2 and 3 show the automatic vehicle fueling assembly 2 before fueling, during upward movement of the pump assembly 60 toward fuel tank inlet assembly 30 including engagement of the fuel entrance 33 by the collar 70, and during fueling, respectively.

As can be seen in FIG. 1, pump assembly 60 is in its normal pre-fueling state with sheath 65 held between springs 67. In FIG. 2, pump assembly remains in such pre-fueling state, but collar 70 has contacted and engaged fuel entrance 33 (while risers 81 are illustrated as having the same height as in FIG. 1, risers 81 would have extended to move collar 70 into contact with fuel entrance 33 from the non-contact position in FIG. 1). In FIG. 3, sheath 65 is shown compressed, with nozzle 62 extending out of sheath cavity 63 and into inlet cavity 52. As can be seen, seals 72 and sealing doors 53 engage nozzle 62 and provide a seal such that fuel does not escape. Risers 81 are extending upwardly while drain hose 77 and fuel pipe 82 have extended.

Figure 6:
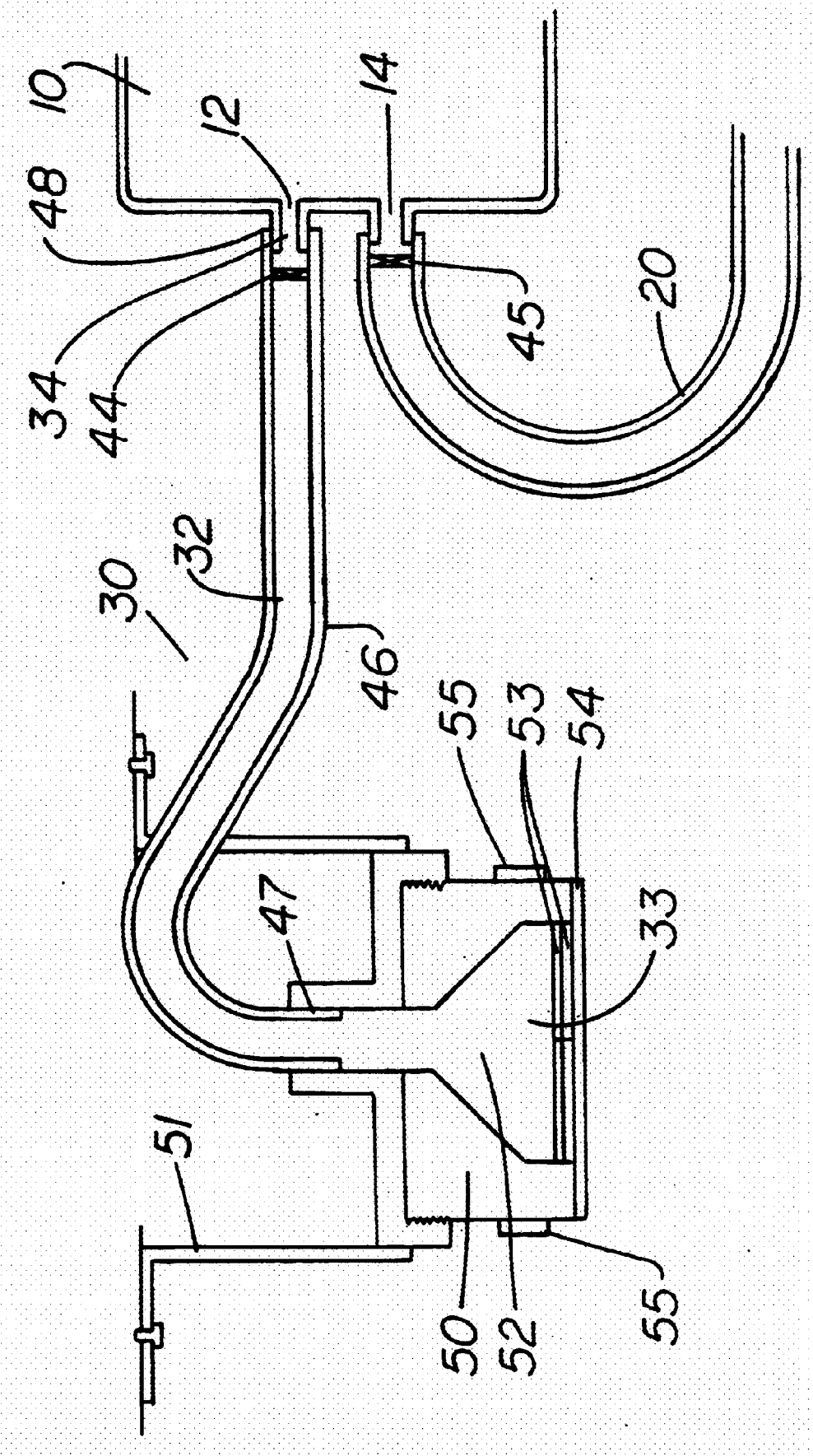
FIG. 6 is a larger cross sectional view (not to scale) of an alternate embodiment of the fuel tank inlet assembly.

FIG. 6 depicts an alternate embodiment to the fuel tank inlet assembly shown in FIG. 4. In the alternate embodiment gas tank 10 includes two separate fuel ports 12,14. Fuel exit 34 of fuel conduit 32 (or second end 48 of flexible fuel hose 46) connects to first fuel port 12 while fuel line 20 connects to second fuel port 14. Unidirectional first valve 44 and second valve 45 must be positioned in fuel conduit 32 and fuel line 20 to prevent fuel from flowing from tank 10 to fuel entrance 33 (or first end 47 of flexible fuel hose 46). Flexible hose 46 allows fuel inlet adapter 50 to be positioned anywhere on the underside of the vehicle and provides that any force applied to inlet adapter 50 is not transferred to tank 10, thereby preventing damage to tank 10.

Figure 7:
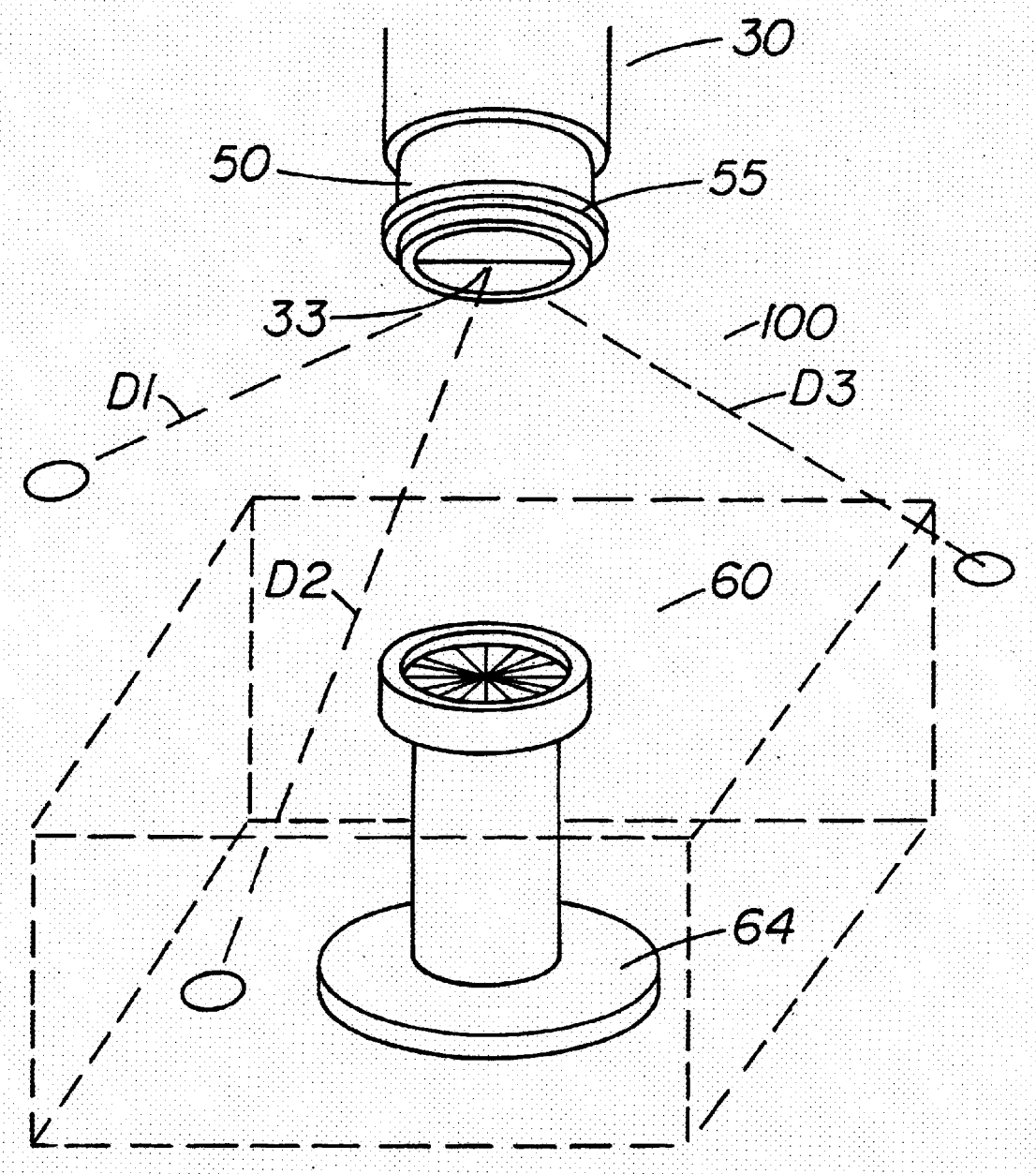
FIG. 7 is a schematic plan view of the automatic vehicle fueling assembly with the ground surface in phantom and including the positioning system in accordance with this invention.

FIG. 7 is a schematic view of the invention including positioning system 100. As stated above, conductive reference marker 55 is placed at a fixed position with a known position relative to fuel entrance 33. As shown, reference marker 55 is an annular piece attached to adapter 50. At least three sense inductors 90 are placed around pump assembly 40 at a known position relative to lateral movement device 80. Sense inductors 90 are shown embedded in the ground surrounding pump assembly 40 (which is shown beneath the ground before it is moved into fueling position). Distances D1,D2,D3 between sense inductors 90 and reference marker 55 are measured via inductance variation in each sense inductor. Measurement continues as pump assembly 60 is moved upwardly. A controller compares the inductance variation in for each sense inductor and uses triangulation calculations to determine the exact position of reference marker 55, and thus, fuel entrance 33, relative to pump assembly 30. In this manner, as soon as a vehicle is positioned at a fueling station, the pump assembly can begin upward movement while determining the position of fuel entrance 33. Upon determination of this position, controller continues to operate lateral movement device 80 and risers 81 to position nozzle 62 for engagement with fuel tank inlet assembly 30.

Although shown attached to fuel inlet adapter 50, reference marker 55 could be placed at any position allowing for inductance variation in sense inductors 90 as long as the position has a known position relative to fuel entrance 33.

Figure 9:
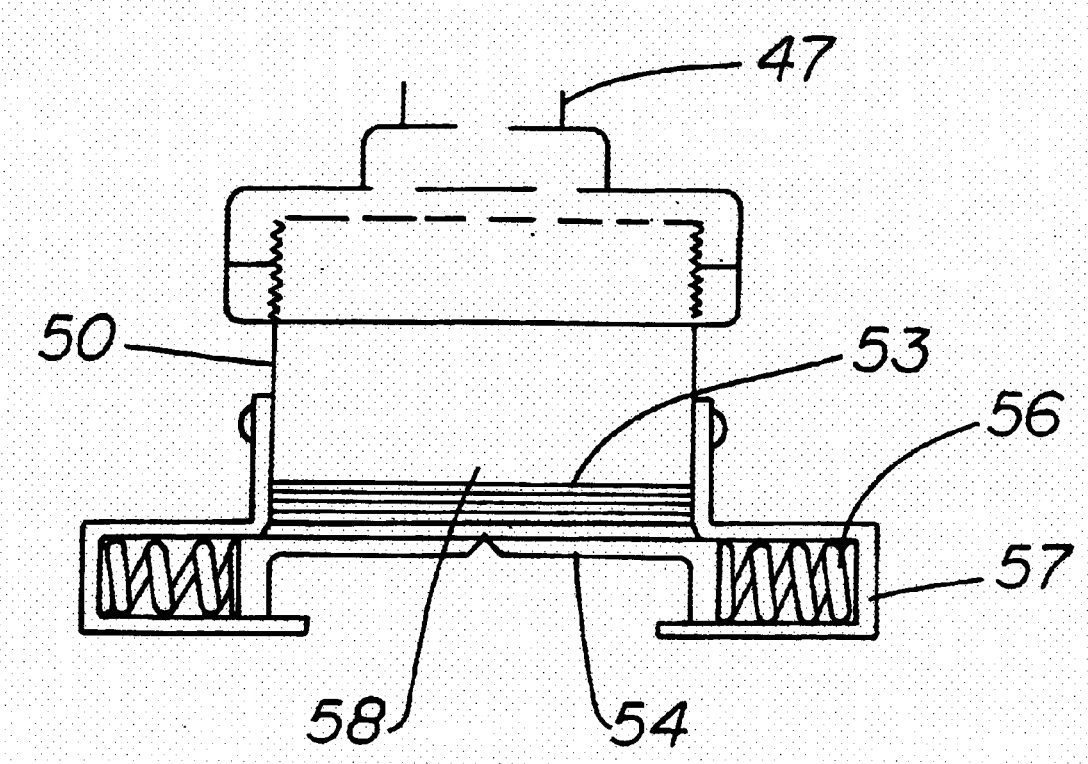
FIG. 9 is a cross section view of the fuel inlet adapter showing the operative details of the slide cover.

FIG. 8 shows the arrangement of sealing doors 53 covering inlet cavity 52. FIG. 9 shows the design of slide cover 54. Slide cover 54 is comprised of two semicircular pieces which are sized to cover fuel entrance 33. Bracket 57 is fixed to adapter 50 and holds the semicircular pieces between two sets of springs 56 which are biased to force slide cover shut. Each semicircular piece includes a notch 58 at its straight edge. As nozzle 62 moves upward into cover 54, it moves into notch 58 and forces slide cover 54 open. When nozzle 62 is removed from inlet cavity 52, springs 56 force slide cover 54 shut.

While the principles of this invention have been described in connection with specific embodiments, it should be understood clearly that these descriptions are made only by way of example and are not intended to limit the scope of the invention.

What is claimed is:

1. An automatic vehicle fueling assembly for use with a standard vehicle fuel tank and fuel line, the automatic fueling assembly comprising:
   a pump assembly including a fuel nozzle defining a passageway for fuel; and
   a fuel tank inlet assembly having (a) a fitting with at least a first, second and third opening and (b) a fuel conduit with a fuel entrance and a fuel exit, the fuel entrance for operative connection with the fuel nozzle, the fuel exit for operative connection with the fuel tank, the first opening for operative connection to the fuel nozzle during fueling, the second opening operatively connected to the fuel line, and the third opening operatively connected to the fuel tank.

2. The fueling assembly of claim 1 wherein the fuel tank inlet assembly further includes a first valve for controlling fuel flow through the first opening and a second valve for controlling fuel flow through the second opening.

3. The fueling assembly of claim 2 wherein the valves allow unidirectional fuel flow toward the fuel tank.

4. The fueling assembly of claim 3 wherein the valves are spring loaded.

5. The fueling assembly of claim 2 wherein the fuel conduit includes a flexible fuel hose having a first end for operative connection to the fuel nozzle during fueling and a second end operatively connected to the first opening of the fitting.

6. The fueling assembly of claim 5 further including a fuel inlet adapter connected with respect to the first end of the fuel hose, the fuel inlet adapter being mounted to the vehicle and having an inlet cavity for receiving the fuel nozzle, flexible sealing doors extending into the inlet cavity and a slide cover for preventing debris from entering the cavity, the slide cover opening upon contact with the fuel nozzle.

7. The fueling assembly of claim 1 wherein the pump assembly further includes a frame supporting the fuel nozzle, the frame positioned below the vehicle before fueling and being upwardly moveable to provide operative connection between the nozzle and the fuel entrance.

8. An automatic vehicle fueling assembly for use with a standard vehicle fuel tank and fuel line, the automatic fueling assembly comprising:
   a fuel tank inlet assembly having a fuel conduit with a fuel entrance and a fuel exit, the fuel exit for operative connection with the standard fuel tank; and
   a pump assembly including (a) a fuel nozzle for operative connection with the fuel entrance, (b) a nozzle sheath having a sheath cavity, the nozzle positioned in the sheath cavity before fueling, (c) a collar for mating engagement with the fuel entrance, the collar connected with respect to the nozzle sheath, and (d) a frame supporting the fuel nozzle, the frame positioned below the vehicle before fueling and being upwardly moveable to provide operative connection between the nozzle and the fuel entrance, the fuel nozzle defining a passageway for fuel.

9. The fueling assembly of claim 8 wherein the nozzle sheath is compressible such that when upward movement of the frame causes the collar to contact the fuel entrance, the sheath stops moving upward and the nozzle continues to move upward out of the sheath cavity and into the inlet cavity.

10. The fueling assembly of claim 7 wherein the frame is connected with respect to at least one riser which powers upward and downward movement of the frame.

11. An automatic vehicle fueling assembly for use with a standard vehicle fuel tank and fuel line, the automatic fueling assembly comprising:
   a fuel tank inlet assembly having a fuel conduit with a fuel entrance and a fuel exit, the fuel exit for operative connection with the standard fuel tank; and
   a pump assembly including (a) a fuel nozzle for operative connection with the fuel entrance, the fuel nozzle defining a passageway for fuel, and (b) a frame supporting the fuel nozzle, the frame positioned below the vehicle before fueling and being upwardly moveable to provide operative connection between the nozzle and the fuel entrance, the frame being connected with respect to at least one riser which powers upward and downward movement of the frame and with respect to a lateral movement device which moves the frame so that the nozzle is substantially aligned with the fuel inlet adapter.

12. The fueling assembly of claim 11 further comprising a positioning system for locating the fuel inlet adapter and controlling the lateral movement device so that the nozzle is substantially aligned with the fuel inlet adapter.

13. The fueling assembly of claim 12 further including a conductive reference marker located at a known position from the fuel inlet adapter and wherein the positioning system comprises:
   at least three sensors located at known positions with respect to the nozzle; and
   a controller for moving the lateral movement device so that the nozzle is substantially aligned with the fuel inlet adapter; and
   whereby the distance between the reference marker and the sensors causes variation in each sensor and the controller uses the variation to calculate the position of the fuel inlet adapter relative to the nozzle.

14. The fueling assembly of claim 13 wherein the controller can calculate the position of the fuel inlet adapter relative to the nozzle as the nozzle is moved upwardly and laterally.

15. The fueling assembly of claim 6 wherein the pump assembly further includes a frame supporting the fuel nozzle, the frame positioned below the vehicle before fueling and being upwardly moveable to provide operative connection between the nozzle and the fuel entrance.

16. The fueling assembly of claim 15 wherein the pump assembly further includes:
   a nozzle sheath having a sheath cavity, the nozzle positioned in the sheath cavity before fueling; and
   a collar for mating engagement with the fuel inlet adapter, the collar connected with respect to the nozzle sheath.

17. The fueling assembly of claim 16 wherein the nozzle sheath is compressible such that when upward movement of the frame causes the collar to contact the fuel inlet adapter, the sheath stops moving upward and the nozzle continues to move upward out of the sheath cavity and into the inlet cavity to provide operative connection with the fuel hose.

18. The fueling assembly of claim 16 wherein the pump assembly further includes:
   a pan for preventing fuel spills, the pan extending outwardly from the nozzle sheath and having a drain opening;
   a flexible drain hose connected with respect to the drain opening and extending to a container;

a shroud for preventing fuel spills, the shroud connected with respect to the pan and having a shroud recess, the collar positioned within the shroud recess.

19. The fueling assembly of claim 17 wherein the pump assembly further comprises a fuel pipe and the nozzle is operatively connected to the fuel pipe.

20. The fueling assembly of claim 19 wherein the pump assembly further comprises a vacuum blower operatively attached to the fuel pipe for removing fuel vapor from the fuel tank during fueling.

21. The fueling assembly of claim 7 wherein the pump assembly further comprises a fuel pipe and the nozzle is operatively connected to the fuel pipe.

22. An automatic vehicle fueling assembly for use with a standard vehicle fuel tank and fuel line, the automatic fueling assembly comprising:
   a fuel tank inlet assembly having a fuel conduit with a fuel entrance and a fuel exit, the fuel exit for operative connection with the standard fuel tank; and
   a pump assembly including (a) a fuel nozzle for operative connection with the fuel entrance, the fuel nozzle defining a passageway for fuel, (b) a frame supporting the fuel nozzle, the frame positioned below the vehicle before fueling and being upwardly moveable to provide operative connection between the nozzle and the fuel entrance, (c) a fuel pipe operatively connected to the nozzle, and (d) a vacuum blower operatively attached to the fuel pipe for removing fuel vapor from the fuel tank during fueling.

23. A vehicle fuel tank inlet assembly for use with a fuel tank having a fuel line leading to a fueling position which allows manual fueling, the assembly delivering fuel to a fuel tank during automatic fueling and comprising:
   a flexible fuel conduit with a fuel entrance and a fuel exit, the fuel exit for operative connection with the fuel tank;
   a first unidirectional valve positioned between the fuel tank and the fuel entrance to prevent fuel from moving toward the fuel entrance;
   a second unidirectional valve positioned between the fuel tank and the fueling position to prevent fuel from moving toward the fueling position; and
   a fuel inlet adapter connected with respect to the fuel entrance, the fuel inlet adapter being mounted to the vehicle and having an inlet cavity for receiving a fuel nozzle during automatic fueling.

24. The inlet assembly of claim 23 wherein the valves are spring loaded.

25. The inlet assembly of claim 23 wherein the fuel inlet adapter includes flexible sealing doors extending into the inlet cavity and a slide cover for preventing debris from entering the cavity, the slide cover opening upon contact with the fuel nozzle.

26. The inlet assembly of claim 23 wherein the fuel inlet adapter is mounted at a position lateral to the tank.

27. The inlet assembly of claim 23 further comprising a conductive reference marker to enable a positioning system to calculate the position of the fuel inlet adapter.

28. A fuel pump assembly for automatic fueling of a vehicle fuel tank, the vehicle having a conductive reference marker located at a known position relative to the fuel tank, the assembly comprising:
   a fuel nozzle for operative connection with the fuel tank, the fuel nozzle defining a passageway for fuel; and
   a positioning system for moving the fuel nozzle into operative connection with the fuel tank during automatic fueling, the positioning system comprising:
      a lateral movement device operatively supporting the nozzle;
      at least three sense inductors for locating the conductive reference marker, each sense inductor located at a known position relative to the nozzle and experiencing inductance variation due to the distance between the marker and the respective sense inductor changes; and
      a controller for moving the lateral movement device in response to inductance variation so that the nozzle is substantially aligned for operative connection to the fuel tank.

29. The pump assembly of claim 28 wherein the controller uses the inductance variation to calculate the position of the fuel tank.

30. The pump assembly of claim 29 wherein the controller can calculate the position of the fuel tank relative to the nozzle as the nozzle is moved upwardly and laterally.

31. The pump assembly of claim 28 wherein the lateral movement device comprises slide plates which can be moved in a first direction and in a second direction substantially perpendicular to the first direction.

32. The pump assembly of claim 31 further comprising a frame supporting the fuel nozzle, the frame positioned below the vehicle before fueling and being upwardly moveable to provide operative connection between the nozzle and the fuel tank.

33. The pump assembly of claim 32 wherein the frame is connected with respect to at least one riser which powers upward and downward movement of the frame.

34. The fueling assembly of claim 32 wherein the frame is connected with respect to the lateral movement device which moves the frame so that the nozzle is substantially aligned with the fuel tank.

35. The pump assembly of claim 32 wherein the fuel tank has a fuel entrance and further comprising:
   a nozzle sheath having a sheath cavity, the nozzle positioned in the sheath cavity before fueling; and
   a collar for mating engagement with the fuel entrance, the collar connected with respect to the nozzle sheath.

36. The pump assembly of claim 35 wherein the nozzle sheath is compressible such that when upward movement of the frame causes the collar to contact the fuel entrance, the sheath stops moving upward and the nozzle continues to move upward out of the sheath cavity.

37. The pump assembly of claim 32 further including:
   a pan for preventing fuel spills, the pan extending outwardly from the nozzle sheath and having a drain opening;
   a flexible drain hose connected with respect to the drain opening and extending to a container; and
   a shroud for preventing fuel spills, the shroud connected with respect to the pan and having a shroud recess, the collar positioned within the shroud recess.

38. The pump assembly of claim 32 further comprising a fuel pipe, the nozzle being operatively connected to the fuel pipe so that fuel passes from the fuel pipe through the nozzle.

39. The fueling assembly of claim 38 wherein the pump assembly further comprises a vacuum blower operatively attached to the fuel pipe for removing fuel vapor from the fuel tank during fueling.

40. A fuel pump assembly for automatic fueling of a vehicle fuel tank, the vehicle having a reference marker located at a known position relative to the fuel tank, the assembly comprising:

a fuel nozzle for operative connection with the fuel tank, the fuel nozzle defining a passageway for fuel; and a positioning system for moving the fuel nozzle into operative connection with the fuel tank during automatic fueling, the positioning system comprising:

a lateral movement device operatively supporting the nozzle;

sensors for locating the reference marker, each sensor located at a known position relative to the nozzle and sensing the position of the reference marker; and a controller for moving the lateral movement device in response to the sensors so that the nozzle is substantially aligned for operative connection to the fuel tank.

41. The fuel pump assembly of claim 40 wherein the positioning system includes at least three sensors and uses triangulation to align the nozzle for operative connection to the fuel tank.

42. The fuel pump assembly of claim 41 wherein the reference marker is conductive.

43. The fuel pump assembly of claim 40 wherein the sensors use inductance to sense the position of the reference marker.

\* \* \* \* \*